(12) United States Patent
Bourdev (10) Patent No.: US 7,738,680 B1
(45) Date of Patent: Jun. 15, 2010

(54) DETECTING AN OBJECT WITHIN AN IMAGE BY INCREMENTALLY EVALUATING SUBWINDOWS OF THE IMAGE IN PARALLEL

(75) Inventor: Lubomir D. Bourdev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1589 days.

(21) Appl. No.: 10/997,448

(22) Filed: Nov. 24, 2004

(51) Int. Cl.
*G06K 9/00* (2006.01)
(52) U.S. Cl. .................................................. 382/103
(58) Field of Classification Search ................ 382/103, 382/150, 173, 205, 225, 176, 190; 348/169
See application file for complete search history.

(56) References Cited

U.S. PATENT DOCUMENTS

| | | | |
|---|---|---|---|
| 4,975,969 A | 12/1990 | Tal | |
| 5,164,992 A | 11/1992 | Turk et al. | |
| 5,414,781 A | 5/1995 | Spitz et al. | |
| 5,450,504 A | 9/1995 | Cailia | |
| 5,642,431 A | 6/1997 | Poggio et al. | |
| 5,761,337 A * | 6/1998 | Nishimura et al. | 382/150 |
| 6,272,240 B1 * | 8/2001 | Li et al. | 382/173 |
| 6,697,103 B1 | 2/2004 | Fernandez et al. | |
| 7,274,832 B2 | 9/2007 | Nicponski | |
| 7,440,587 B1 * | 10/2008 | Bourdev | 382/103 |
| 2006/0187305 A1 | 8/2006 | Trivedi et al. | |

OTHER PUBLICATIONS

P. Viola and M. Jones, "Robust Real-Time Object Detection," ICCV, Cancouver, Canada, 2001.
F. Crow, "Summed Area Tables for Texture Mapping," SIGGRAPH 1984.
H. Rowley, S. Baluja and T. Kanade, "Neural Network-Based Face Detection," In IEEE Pattern Analysis and Machine Intelligence, vol. 20, 1998.
H. Schneiderman, "A Statistical Approach to 3D Object Detection Applies to Faces and Cars," Ph.D. Thesis, CMU, May 2000.
R. Feraud, O. Bernier, J. Viallet, M. Collobert, "A Fast and Accurate Face Detector Based on Neural Networks," IEEE Transactions on Pattern Analysis and Machine Intelligence, vol. 23, Jan. 2001.
B. Heisele, T. Serre, S. Prentice, T. Poggio, "Hierarchical Classification and Feature Reduction for Fast Face Detection with Support Vector Machines," Pattern Recognition 36, 2003.

(Continued)

*Primary Examiner*—Duy M Dang
(74) *Attorney, Agent, or Firm*—Robert C. Kowert; Meyertons, Hood, Kivlin, Kowert & Goetzel, P.C.

(57) ABSTRACT

One embodiment of the present invention provides a system for detecting an occurrence of an object in an image. During operation, the system selects a subwindow to be evaluated based upon a currently estimated likelihood of the object being detected within the subwindow. The system then performs an evaluation step on the subwindow to determine if the object exists in the subwindow, wherein performing the evaluation step involves updating the currently estimated likelihood of the object being detected in the subwindow. If evaluation of the subwindow is not complete after performing the evaluation step, the system stores information associated with the subwindow to facilitate subsequent evaluation of the subwindow.

27 Claims, 8 Drawing Sheets

OTHER PUBLICATIONS

B. Scassellati, "Eye Finding via Face Detection for a Foveated, Active Vision System," Proceedings of 15th National Conference of Artificial Intelligence, 1998.

H. Sahbi, N. Boujemmaa, Coarse-to-Fine Support Vector Classifiers for Face Detection, ICPR 2002.

A. Rosenfeld, G.J. Vanderbrug, "Coarse-Fine Template Matching," IEEE Trans. Syst. Man Cybernet. 2, 1997.

J. Edwards, H. Murase, "Appearance Matching of Occluded Objects Using Coarse-to-Fine Adaptive Masks," CVPR, 1997.

H. Schneiderman, T. Kanade, "Object Detection Using the Statistics of Parts," International Journal of Computer Vision, 2002.

Z. Sun, G. Bebis, R. Miller, "Quantized Wavelet Features and Support Vector Machines for On-Road Vehicle Detection," Seventh International Conference on Control, Automation, Robotics and Vision, 2002.

M. Yang, D. Kriegman, N. Ahuja, "Detecting Faces in Images: A Survey," IEEE Transactions on Pattern Analysis and Machine Intelligence, vol. 24, 2002.

U.S. Appl. No. 11/069,692, filed Feb. 28, 2005.

U.S. Appl. No. 10/997,395, filed Nov. 24, 2004.

Publication entitled: "A Fast and Accurate Face Detector Based on Neural Networks", by Feraud et al., IEEE Transactions on Pattern Analysis and Machine Intelligence, vol. 23, No. 1, Jan. 2001, pp. 42 to 53.

* cited by examiner

EVEN THOUGH THE PRE-SIGMOID DELTAS OF THE TWO HIDDEN UNITS ARE EQUAL ($\Delta x_1 = \Delta x_2$) THEIR POST-SIGMOID DELTAS ARE DIFFERENT ($\Delta y_1 \neq \Delta y_2$)

FIG. 6

DETECTING AN OBJECT WITHIN AN IMAGE BY INCREMENTALLY EVALUATING SUBWINDOWS OF THE IMAGE IN PARALLEL

FIELD OF THE INVENTION

The present invention relates to techniques for detecting objects within images. More specifically, the present invention relates to a method and an apparatus for detecting an object within an image using parallel incremental evaluations of sub-windows of the image.

BACKGROUND

As computer systems are becoming more powerful, they are being used for increasingly computationally intensive tasks involving large images. One such task is "object detection." The goal of object detection is to determine the presence and location of objects of a given type (such as faces) within one or more digital images. Typically, object detection begins by training a classifier (an object detector) to recognize the presence of the object of interest within a 2D window of a suitable aspect ratio. Then the trained detector is applied to a comprehensive set of subwindows to identify those subwindows that produce a detector response above a given acceptance threshold.

For example, the detector may be trained to determine whether a given 20×20 window of grayscale pixels represents a low resolution frontal view of a human face. To determine whether a digital image contains a face, the detector can be applied to every 20×20 scan window in an image, so that it can take into account a comprehensive set of positions, scales and orientations. Specifically, we can first check all 20×20 windows centered at each pixel, then we may scale down the image to, say, 90% of its original size and again check every 20×20 window. Note that by applying the detector to scaled down versions of the image we can look for larger (or smaller) examples of the object. Furthermore, we can also resample each scaled image at various angles and scan the result to search for the presence and location of the object at various angular orientations.

Traditional methods for object detection analyze the scan windows sequentially, which means that they fully analyze each window before proceeding to the next window. This typically involves scanning subwindows in each row, left-to right, and each column, top-to-bottom. Furthermore, it can involve performing object detection for each scale, small-to large, and each orientation. Consequently, object detection is very computationally intensive because it involves analyzing subwindows of any discrete position, scale and orientation. For example, a 1024×768 image analyzed at six scales and six orientations has well over 10 million subwindows.

Furthermore, traditional object detection systems are not suitable for a variety of contexts in which object detection is needed. For example, certain applications of face detection do not require finding all the faces in the image. For example, for a "show images containing faces" search feature it is sufficient to find a single face in an image to determine whether to show the image. Moreover, some applications can only devote fixed amount of time per image, such as video surveillance systems that provide real-time image analysis. These applications try to do the best they can while keeping up with the frame rate. Other applications can take more time, but need the best intermediate results, such as a computer-assisted person tagging system, in which the user can start correcting the tag assignments before the system has analyzed all images in full. Hence, in some cases comprehensive detection may take more time than the system can allow, and in other cases it is better for the system to spend more time in the hope of finding more instances of the object.

Unfortunately, the speed/detection rate tradeoff is hard-coded in traditional systems and cannot be changed dynamically. While it is possible to interrupt a traditional detection process and ask for all found instances of the object, the number of instances (or detection probability) is linear on the time spent. In other words, all things being equal, interrupting a traditional system after half of the time needed to fully analyze an image will on average detect 50% of the object occurrences.

Hence, what is needed is a method and an apparatus for detecting an object within an image without the above-described problems.

SUMMARY

One embodiment of the present invention provides a system for detecting an occurrence of an object in an image. During operation, the system selects a subwindow to be evaluated based upon a currently estimated likelihood of the object being detected within the subwindow. The system then performs an evaluation step on the subwindow to determine if the object exists in the subwindow, wherein performing the evaluation step involves updating the currently estimated likelihood of the object being detected in the subwindow. If evaluation of the subwindow is not complete after performing the evaluation step, the system stores information associated with the subwindow to facilitate subsequent evaluation of the subwindow.

In a variation on this embodiment, storing the information associated with the subwindow involves updating and storing the currently estimated likelihood of the object being detected within the subwindow.

In a further variation, storing the information associated with subwindows also involves: storing the subwindow itself, or storing location information for the subwindow; and storing intermediate results, if any, associated with evaluation of the subwindow.

In a variation on this embodiment, selecting the subwindow to be evaluated involves: selecting a new subwindow; or selecting a partially evaluated subwindow.

In a variation on this embodiment, if the currently estimated likelihood of the object being detected in the subwindow drops below a minimum value, the system discards the subwindow.

In a variation on this embodiment, if currently estimated likelihood of the object being detected in the subwindow exceeds a predetermined value, the system fully evaluates the subwindow.

In a variation on this embodiment, storing the information associated with the subwindow involves storing the information ordered by estimated likelihood to facilitate selecting the subwindow later based on the currently estimated likelihood of the object being detected within the subwindow.

In a variation on this embodiment, performing the evaluation step on the subwindow involves using an incrementally evaluatable detector, which is based on a neural network.

In a variation on this embodiment, the system is configured to: perform a first evaluation step on a first subwindow to determine if the object exists in the first subwindow; perform a first evaluation step on a second subwindow to determine if the object exists in the second subwindow; and to subsequently perform a second evaluation step on the first subwindow.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Image Processing System

Figure 1:
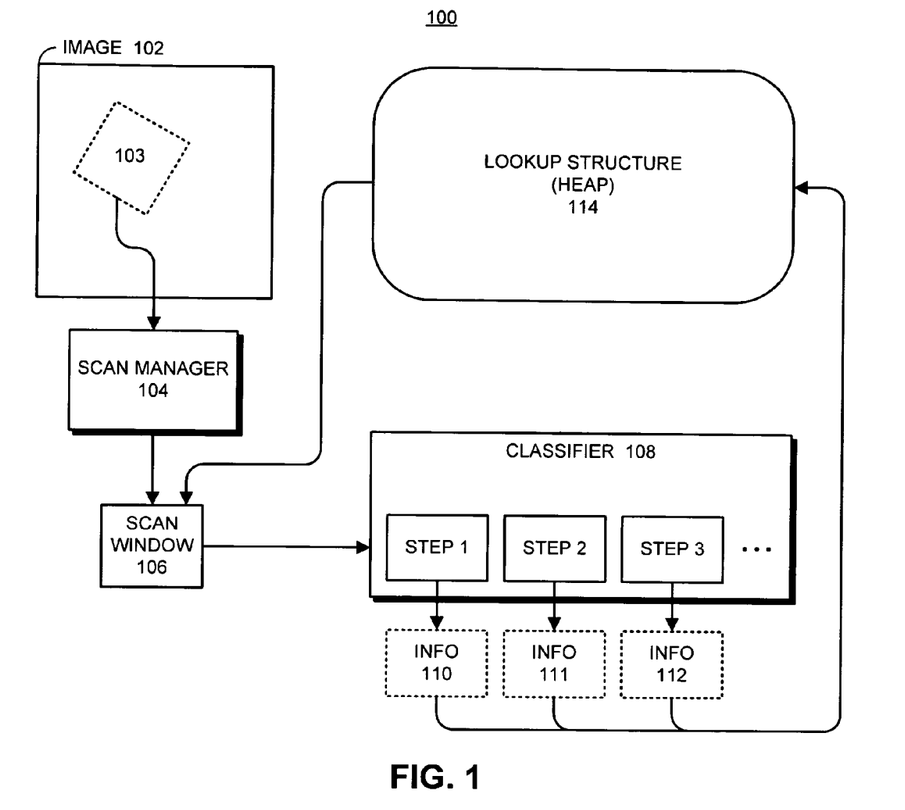
FIG. 1 illustrates an image processing system in accordance with an embodiment of the present invention.

FIG. 1 illustrates an image processing system 100 in accordance with an embodiment of the present invention. This image processing system 100 includes a scan manager 104, which receives an image 102 as input. Scan manager 104 locates a subwindow 103 of the image 102, and then transforms the subwindow 103 by rotating it or scaling it to produce a scan window 106 that feeds into a classifier 108. For example, image 102 can be a 1024 by 786 pixel grey-scale image, and scan window 106 can be a 20 by 20 pixel grey-scale subwindow of image 102.

Note that the terms "subwindow" and "scan window" are used interchangeably throughout this specification. Also note that the term "subwindow" as used in this specification and appended claims is not meant to be limited to a rectangular subwindow. In general, the term subwindow can refer to any sub-region of the window of any shape.

Classifier 108 can include any type of classifier that can determine whether or not the scan window 106 contains a desired object. Moreover, classifier 108 supports incremental evaluation operations for scan window 106. More specifically, classifier divides the evaluation of scan window 106 into a number of evaluation steps (step1, step2 and step3). Each of these evaluation steps can be performed separately, and produces information which can be stored in lookup structure 114.

Figure 2:
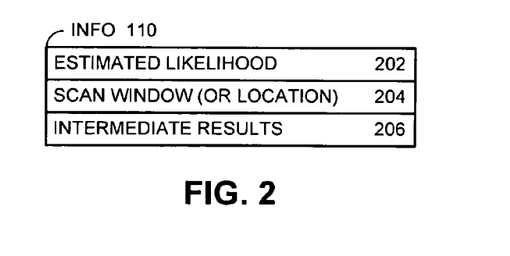
FIG. 2 illustrates information that is stored for a partially evaluated subwindow in accordance with an embodiment of the present invention.

Lookup structure 114 can generally be any type of data structure, which can store information associated with partially evaluated scan windows. Referring to FIG. 2, this information can include an estimated likelihood 202 that the object of interest is contained within the scan window. It can also include the scan window itself (or location information for the scan window) 204, as well as intermediate results for the scan window during the evaluation process 206.

In one embodiment of the present invention, lookup structure 114 is a heap, which maintains a partial ordering of the scan windows based upon their estimated likelihoods of containing the object. This facilitates retrieving the scan window with the highest estimated likelihood of containing the object.

Note that classifier 108 can either process new scan windows received from scan manager 104, or alternatively, can process partially evaluated scan windows retrieved from lookup structure 114. This process is described in more detail below with reference to the flow chart illustrated in FIG. 3.

Detectors that Support Incremental Evaluation

The present invention uses a class of detectors that can be incrementally evaluated. In these detectors, a given subwindow can be evaluated in a fixed number of evaluation steps. After each evaluation step, the detector determines its best guess of the likelihood of the object being present in the given subwindow.

Using such detectors has the following advantages. (1) We can discontinue the evaluation of the detector after a certain number of steps if the likelihood of the presence of the object remains low, thereby saving unnecessary computation and speeding up detection. (2) We can incrementally evaluate multiple detectors simultaneously and focus the analysis on the most promising detectors. This allows us to discover many of the objects of interest shortly after the beginning of the analysis.

DEFINITIONS

Let W and H be positive integers defining a 2D window of fixed size. Let U be the space of all subwindows with aspect ratio W/H in all images. The dimensions of U are implementation-dependent and may include the image, the x and y coordinates within the image, the scale, and the orientation. This general definition of U simplifies the notation and allows us to refer to any subwindows (training examples, test examples, places where we search for the object, etc.) simply as points in U. In this specification, we will consider only a space with finite and discrete dimensions.

The training space T∈U contains a set of points that represent centers of the objects used for training the detector. The search space X∈U is the space of all subwindows in all images which we are searching for occurrences of the object of interest. XP is the set of all points representing such occurrences (i.e. centers of objects).

C∈U is the calibration space. It contains a set of N points $CP=\{cp_1 \ldots cp_N\} \in C$ which represent N examples of the object of interest. We will need those objects to calibrate the detector, as described later in the paper.

X, T and C are disjoint subspaces of U. T and C are representative of X.

The object detector $D_{W,H}: U \to [0;1]$ determines the likelihood of the object of interest being present at a given point in U. The point in U is mapped onto a 2D normalized grid of W by H pixels (translating, scaling, rotating, normalizing the lighting appropriately). This 2D grid is analyzed by the detector to determine the likelihood.

A detector is incrementally evaluatable if the evaluation computations can be broken down into S steps. After each step $i \in [1;S]$, the detector returns $D_i(x)$, its best guess to the presence of the object at the evaluation point x. Thus $D_S(x)=D(x)$. There are three desirable conditions of incrementally evaluatable detectors: that the sequence $D_1(x) \ldots D_S(x)$ is somewhat monotonic; that the time to evaluate all steps does not exceed too much the time to fully evaluate the detector; and that there is a large number of steps S. The benefits of the method described in this specification directly relate to how well the detector satisfies these conditions.

$\mu_i \in [0,1]$, and $\sigma_i \in [-1;1]$ are our estimates of the mean and the standard deviation of the detector's response at step i when applied at the center of an object. They are computed during the calibration of the detector (as described below). $NR_i(x) \in R$ is the normalized response of the detector at step i applied at point x. It indicates how promising point x is for further evaluation.

$t_R \in R$ is the rejection threshold. If the normalized response of the detector falls below $t_R$ the evaluation of the detector is suspended, since it is unlikely that there is an object at that point.

$t_A \in R$ is the acceptance threshold. If the normalized response of the detector exceeds $t_A$ the detector is fully evaluated, since it is likely that there is an object at that point.

Parallel Incremental Detector Evaluation

The trained detector needs to be calibrated before being applied on the test image(s). Calibration is done once only and can be thought as part of the training process. During calibration we estimate the mean and standard deviation of the detector's response at each step i when applied at the center of a positive example. We use the calibration examples CP to estimate these values:

$$\mu_i = \frac{1}{N} \sum_{j \in [1,N]} D_i(cp_j)$$

$$\sigma_i = \sqrt{\frac{1}{N} \sum_{j \in [1,N]} (D_i(cp_j) - \mu_i)^2 - \mu_i}$$

We will use $\mu_i$ and $\sigma_i$ during the search to compute the normalized response of the detector applied at step i on a location x:

$$NR_i(x) = \frac{D_i(x) - \mu_i}{\sigma_i}$$

The normalized response is a measurement of how well the partially evaluated window is doing with respect to an average positive (object) example. The vast majority of windows we evaluate don't have the object, so their normalized responses would do very poorly. If the normalized response is too low, we can discontinue evaluating the window. Alternately, if the normalized response is promisingly high, we can perform a full evaluation at that window.

Figure 3:
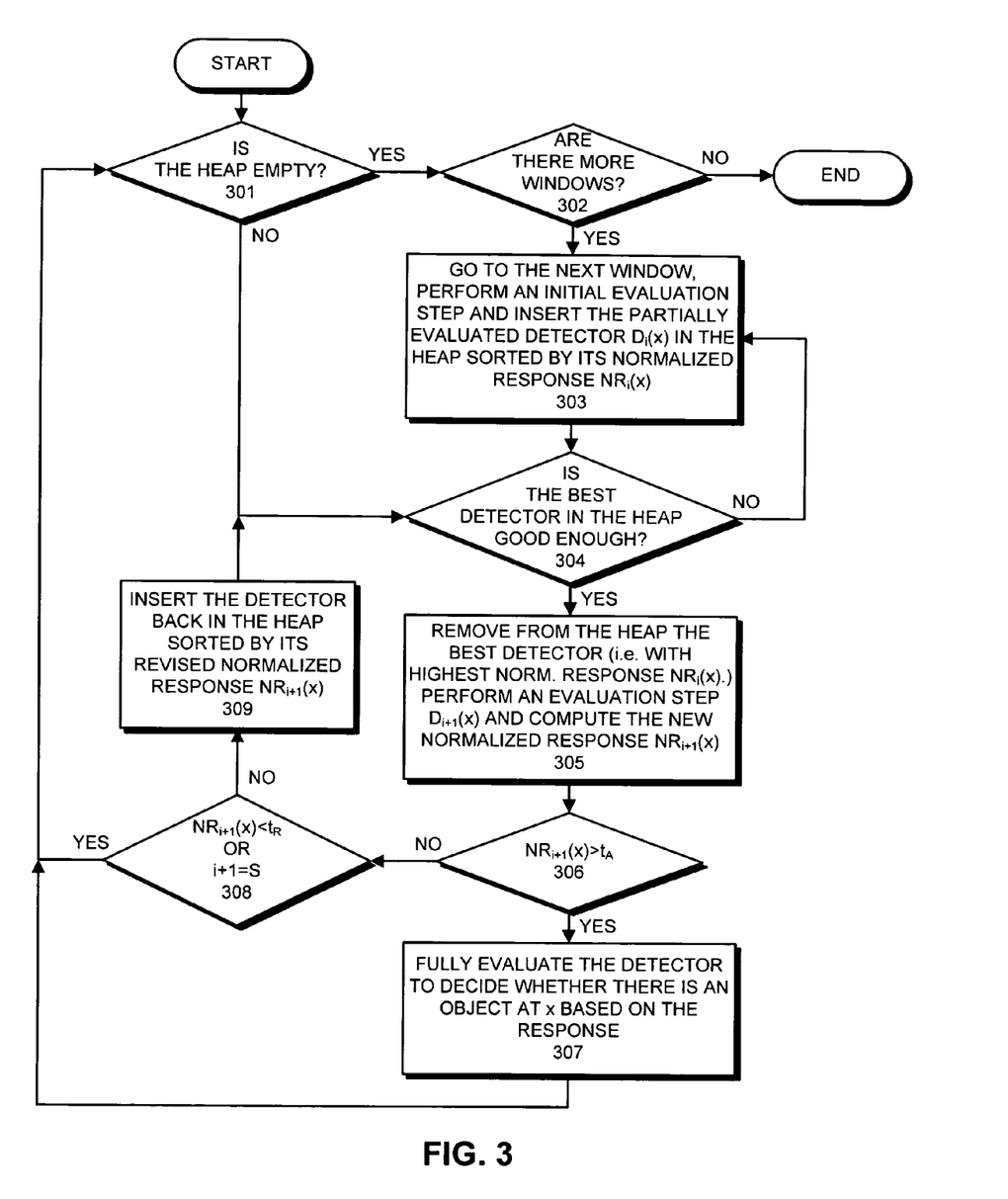
FIG. 3 presents a flow chart illustrating the object detection process in accordance with an embodiment of the present invention.

The search technique is illustrated in FIG. 3. During the scanning process we maintain a heap of the partially evaluated detectors ordered by their normalized response. Initially, the heap is empty (step 301), so we perform a first step evaluation of the first scan window of the image and insert the partially evaluated detector into the heap (step 303). In step 304, we must decide whether to work on evaluating the most promising detector we have in the heap (step 305) or whether to go to step 303 to start a new detector. This decision can be based on the number of unexplored windows left and the expected frequency of objects. The more unexplored windows there are, the more likely we will want to start a new detector on one of them. Alternatively, the more promising the best found detector is, the more likely we would work on it instead. Clearly, if no windows are left, step 304 must choose the "yes" branch. In step 305, we remove the most promising detector from the heap and perform an evaluation step on it. If its new normalized response is higher than the acceptance threshold (step 306), we fully evaluate it (step 307) to see if it is indeed an instance of the object, in which case we add it to the list of found objects. In case the response is not high enough, we check whether it is lower than our rejection threshold or we have fully evaluated the detector (step 308) in which case we discard the current detector (by never putting it back in the heap). Only if the revised normalized response is between the rejection and acceptance thresholds do we insert the detector back in the heap (step 309).

There are various methods to choose appropriate values of $t_A$ and $t_R$. We set $t_R=-3$, i.e. an incremental evaluation is discontinued if its response is three standard deviations less than the normalized response of the average positive example. We use a different value of $t_A$ for each evaluation step i. During calibration, we perform incremental evaluation of a large number of non-object windows and we set $t_{A,i}$ as the normalized response of the highest 1% of normalized responses of non-object examples. In other words, we fully evaluate a test window if it performs better than the top 1% of the non-object examples. For the heuristic at step 304, we choose to evaluate the top detector x in the heap if $NR_i(x) > t_{A,i} * k$ where k=19. This value was picked empirically. A more sophisticated rule, taking into account the size of the heap and the number of unexplored windows left, could result in better performance.

A heap performs insertion and deletion in O(log N). An alternative method with constant time insert and delete is to subdivide the space of normalized response into bins and consider any detector from the highest occupied bin as the "top". This may not guarantee we always work on the best example, but may work well in practice.

Creating an Incrementally Evaluatable Detector from a Neural Network

The method described in this paper requires that the detector be incrementally evaluatable. Neural networks are often used as the basis for object detectors. In this section we describe a method for incrementally evaluating a neural network.

We will discuss a two layer feed-forward neural network with a single output neuron; however, the method naturally extends to other types of neural networks.

Figure 4:
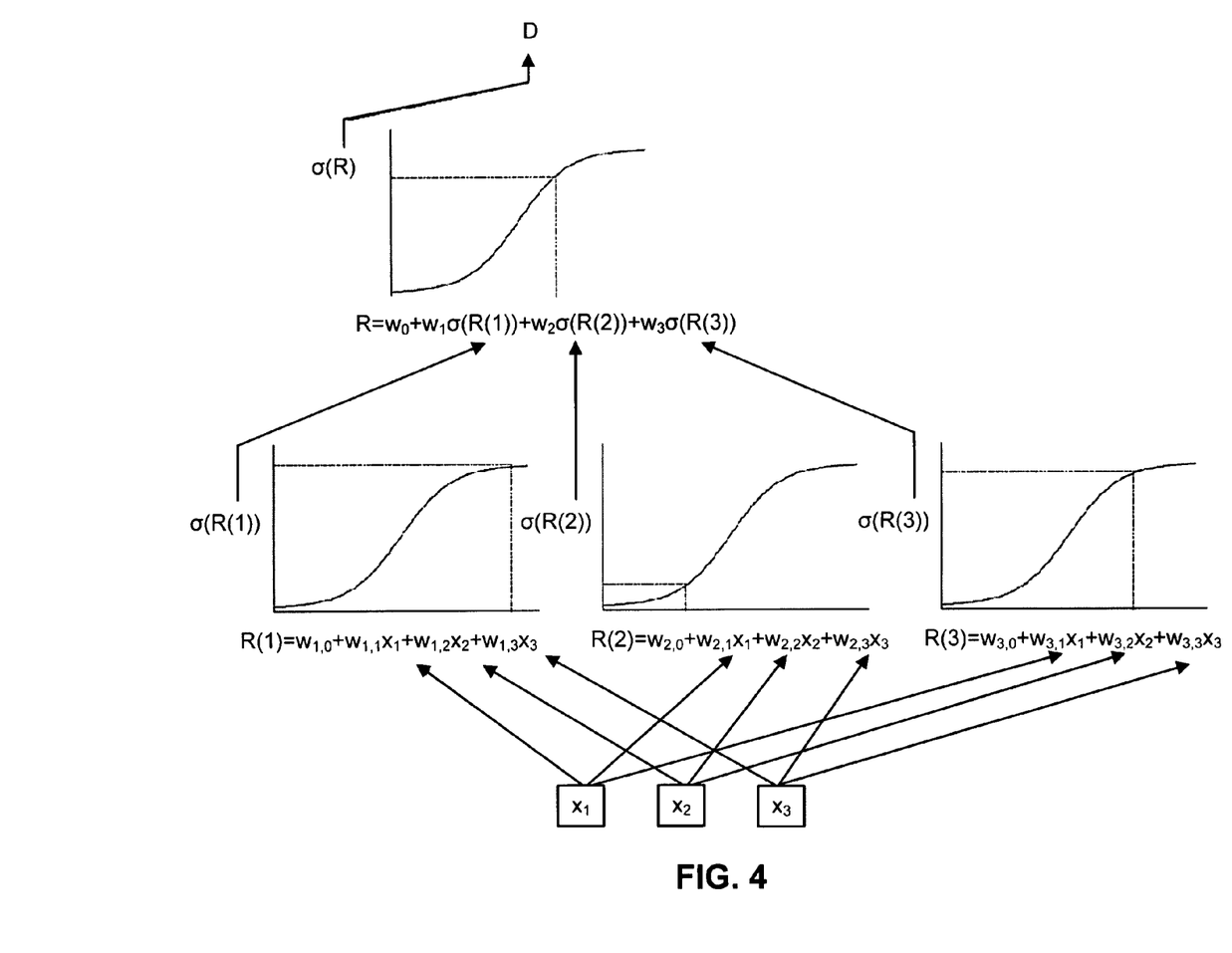
FIG. 4 illustrates an example of a neural network in accordance with an embodiment of the present invention.
Figure 5A:
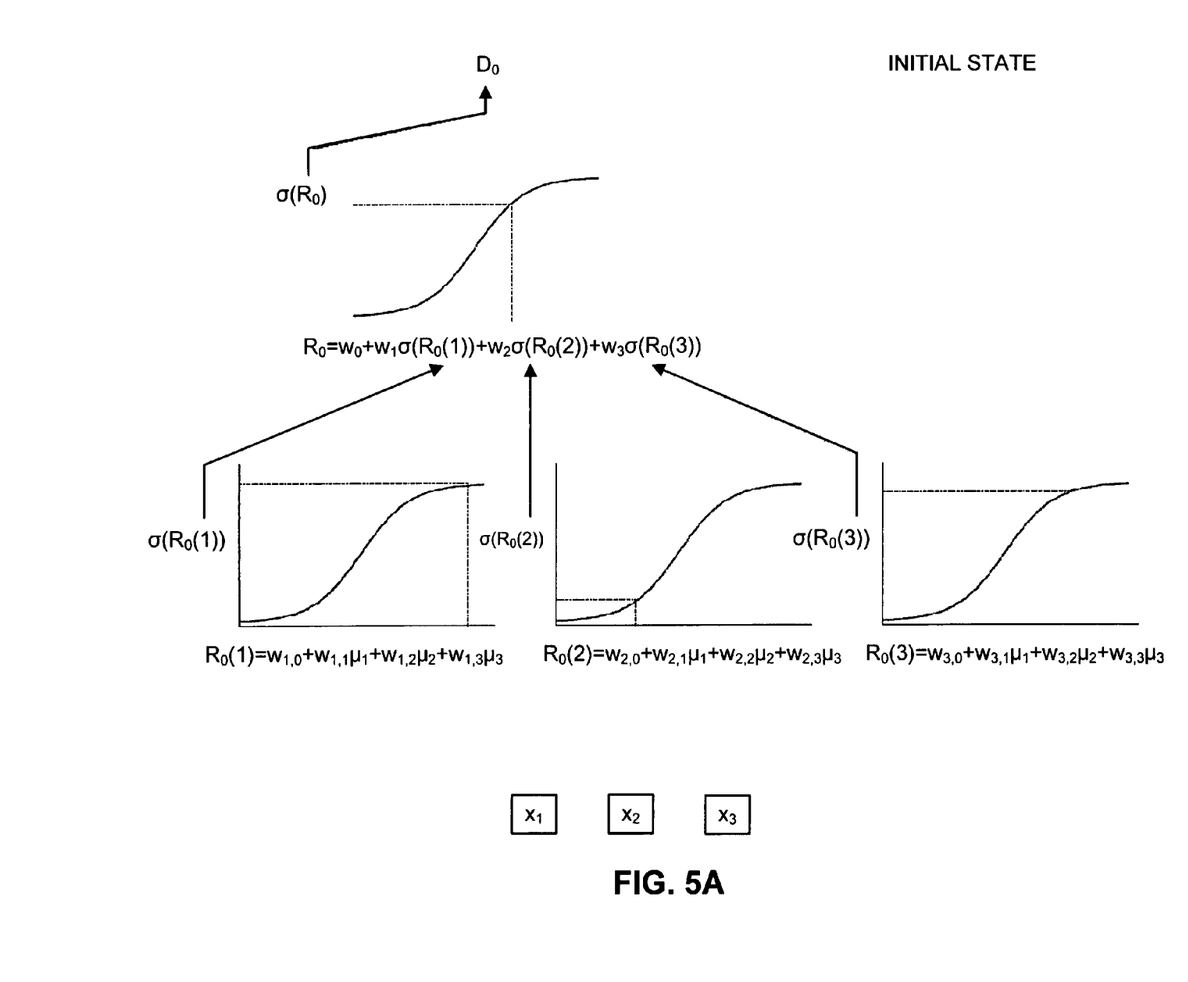
FIG. 5A illustrates an initial state in the process of incrementally evaluating a neural network in accordance with an embodiment of the present invention.
Figure 5B:
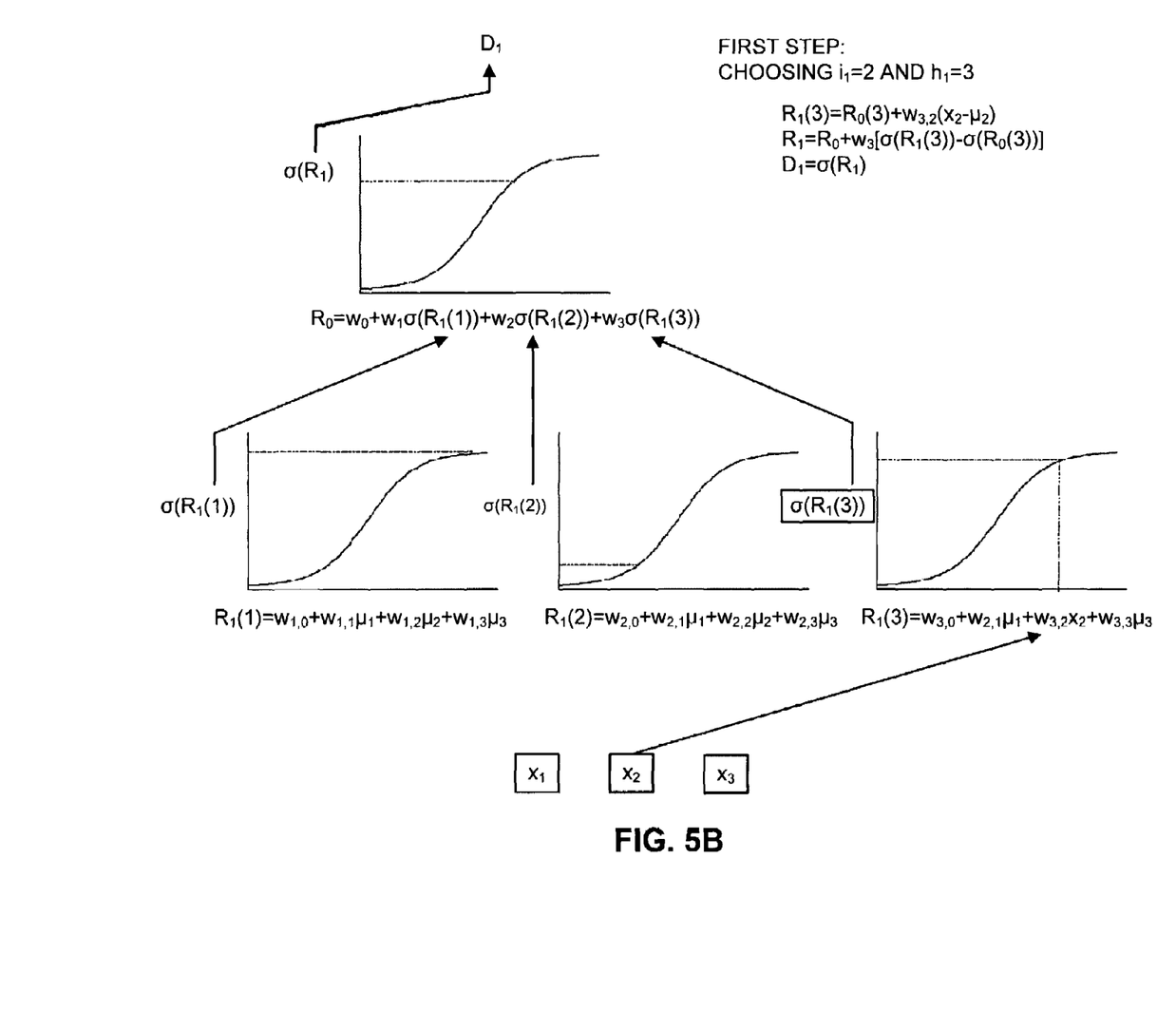
FIG. 5B illustrates the system after one step in the process of incrementally evaluating a neural network in accordance with an embodiment of the present invention.
Figure 5C:
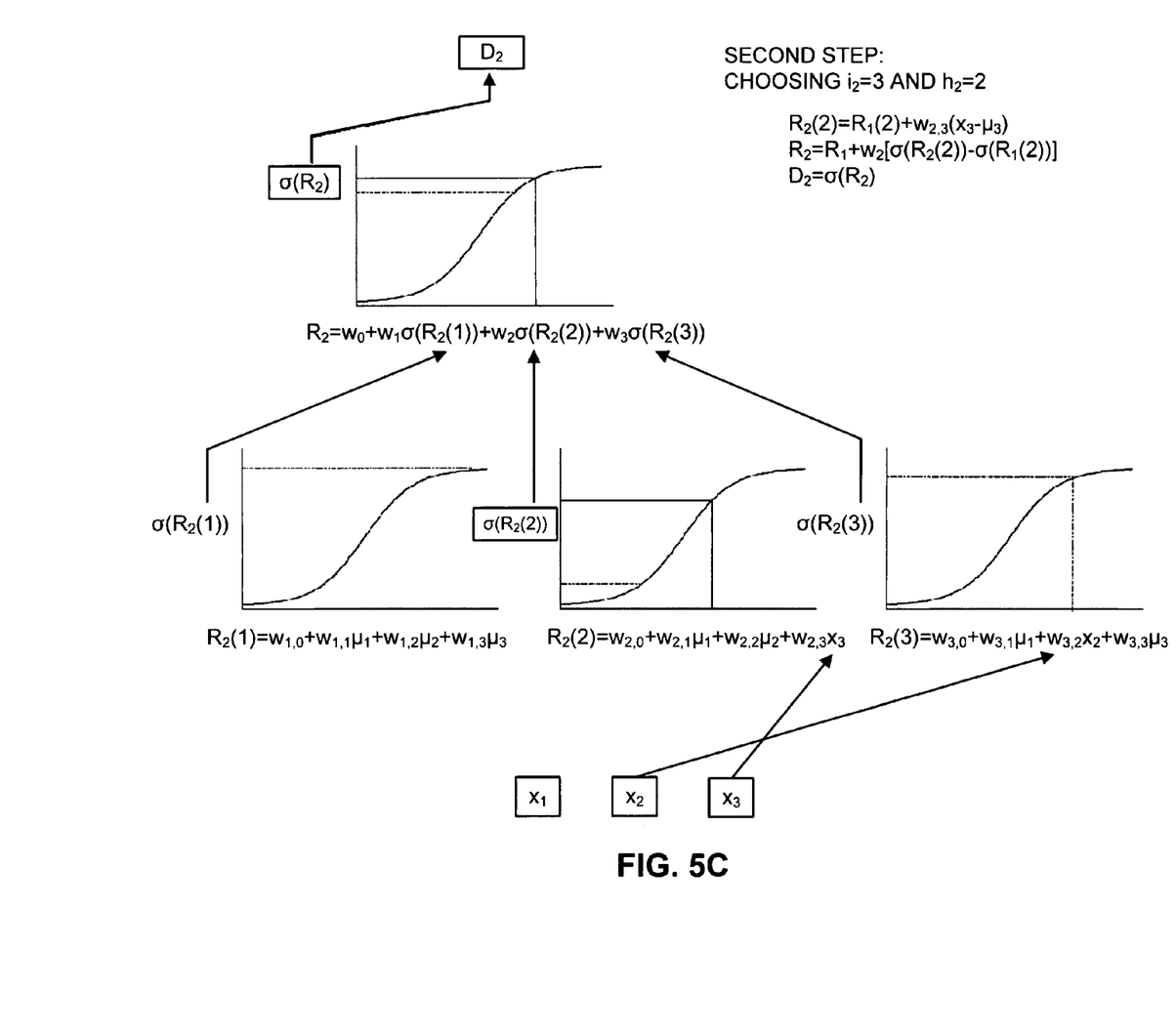
FIG. 5C illustrates the system after two steps in the process of incrementally evaluating a neural network in accordance with an embodiment of the present invention.
Figure 5D:
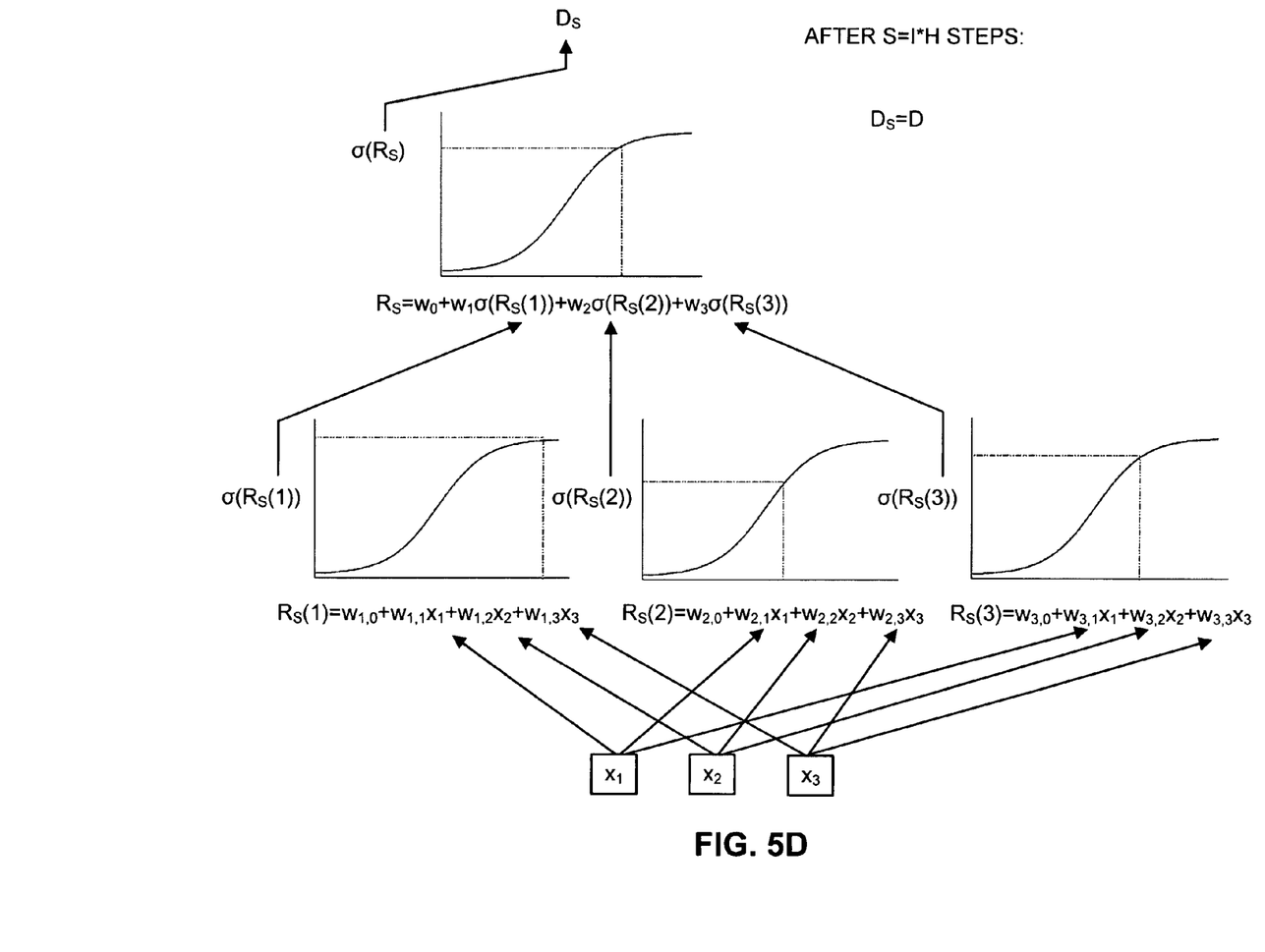
FIG. 5D illustrates the system after all steps in the process of incrementally evaluating a neural network in accordance with an embodiment of the present invention.

The neural net consists of a layer of input units, a layer of hidden units and an output unit (FIG. 4). Each hidden unit has a weight for each input unit $w_{h,i}$ and a threshold weight $w_{h,0}$. The output unit has a weight for each hidden unit $w_h$ and a threshold weight $w_0$. The response D(x) of the neural network when presented with an input vector x is:

$$D = \sigma\left(w_0 + \sum_h w_h \sigma\left(w_{h,0} + \sum_i w_{h,i} x_i\right)\right)$$

Where σ(y) is the sigmoid threshold function, for example $$\sigma(y) = \frac{1}{1+e^{-y}}.$$

For simplicity, we are omitting the current image x as the input parameter of D.

We can break down the neural network response function as follows:

$$R(h) = w_{h,0} + \sum_i w_{h,i} x_i$$

$$R = w_0 + \sum_i w_h \sigma(R(h))$$

$$D = \sigma(R)$$

R(h) represents the raw (pre-sigmoid) value of hidden unit h and R is the raw value of the output unit.

The initial response (at step 0) is computed as follows:

$$R_0(h) = w_{h,0} + \sum_i w_{h,i} \mu_i$$

$$R = w_0 + \sum_h w_h \sigma(R_0(h))$$

$$D_0 = \sigma(R_0)$$

where $\mu_i$ is the mean (expected) value of the i-th input. This mean depends on the raw input as well as on the preprocessing operations. It can be estimated by applying the detector at random places in the calibration space and taking the mean value of the input vector. Intuitively, $D_0(x)$ represents our best guess of the detector's response without considering any of the inputs of x. Note that the initial guess of the neural net does not depend on the input vector x and therefore, for efficiency, can be computed during the calibration phase.

The full evaluation consists of I*H number of steps (I is the size of the input vector and H is the number of hidden units). At each step k we evaluate the response as follows: and 1. Pick a unique pair $\langle h_k, i_k \rangle$ of a hidden unit $h=h_k$ and an input unit $i=i_k$; and
2. Evaluate the response as follows:

$$R_k(h) = \begin{cases} R_{k-1}(h) + w_{h,i_k}(x_{i_k} - \mu_{i_k}) & \text{if } h = h_k \\ R_{k-1}(h) & \text{otherwise} \end{cases}$$

$$R_k = R_{k-1} + w_{h_k}(\sigma(R_k(h_k)) - \sigma(R_{k-1}(h_k)))$$

$$D_k = \sigma(R_k).$$

After the last step, the network response equals that of full evaluation:

$$D_{I*H} = D$$

(We can prove that by summing $R_k(h)$ for all steps. The intermediate terms cancel out and we are left with the formula for R(h). The same proof applies to the $R_k$ and therefore to $D_k$.)

We have described the general mechanism for incremental evaluation of a neural network. Now we need to pick the optimal way to select the $h_k$ and $i_k$ to use at each step, so that the network response at each step converges to the final network response as quickly as possible.

Clearly the optimal $\langle h_k, i_k \rangle$ pair is the one with the highest partial derivative. However, maintaining the partial derivatives at each step requires more computations than evaluating the neural network in full. We have to settle for a sub-optimal method that requires preferably constant-time computations at each evaluation step. The parallel evaluation method of this specification imposes an even stricter requirement: the ordering must not depend on the input vector at all (otherwise, we cannot estimate NR, i.e. how well one neural network is doing with respect to another). Thus, the ordering must be precomputed during the calibration step.

Intuitively, we want to start with the $\langle h_k, i_k \rangle$ pairs that result in the largest change to the network response. Once we get the largest changes out of the way, the neural net response should be close to the final one.

Let the notation $^{h,i}R_k$ mean "the raw value of the output unit at step k, should we choose hidden unit h and input unit i." Similarly, let $^iR_k(h)$ mean "the raw value of hidden unit h at step k, should we choose input i." We omit h and i when specifying $R_{k-1}$, the raw value at the previous step, because they have been chosen already.

Let $^h i_k$ be the optimal input unit at step k, should we choose hidden unit h. We want to pick the input i that maximizes the change in the raw response of the h-th hidden unit:

$$^h i_k = \arg\max_i\left(|^i R_k(h) - R_{k-1}(h)|\right) = \arg\max_i\left(|w_{h,i}(x_i - \mu_i)|\right)$$

Unfortunately we cannot use the specific value of $x_i$ during calibration. Instead we use Monte-Carlo sampling to estimate the mean deviation from the calibration set that includes object and non-object windows:

$$\alpha_i = \frac{1}{N}\sum_{p=1}^{N} |^p x_i - \mu_i| \approx |x_i - \mu_i|$$

where $^p x_i$ denotes the value of $x_i$ for the p-th random sample. Thus we have:

$$^h i_k = \arg\max_i(|w_{h,i}\alpha_i|)$$

Note that we are selecting the maximum i only over those inputs that have not been chosen previously with the same hidden unit, i.e.: $\forall b < k,\ ^h i_k \neq\ ^h i_b$ The task of picking the optimal hidden unit is more difficult. Again, we want to pick the hidden unit h that maximizes the change in the raw value of the output unit:

$$h_k = \arg\max_h {}^{h,i}|R_k - R_{k-1}|$$

$$h_k = \arg\max_h |w_h||\sigma(R_k(h)) - \sigma(R_{k-1}(h))|$$

Figure 6:
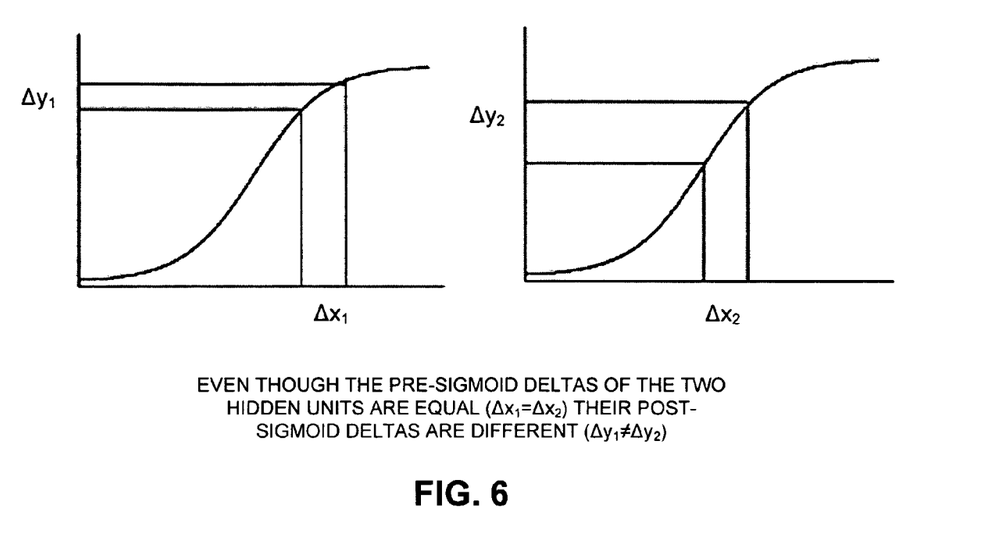
FIG. 6 illustrates equivalent input deltas to two hidden unit in a neural network can produce different output deltas in accordance with an embodiment of the present invention.

The problem is that we cannot, in general, provide a good estimate for $|\sigma(R_k(h))-\sigma(R_{k-1}(h))|$, the magnitude of the post-sigmoid change of the response of hidden unit h. We can estimate $|R_k(h)-R_{k-1}(h)|$, the pre-sigmoid (raw) magnitude change, but the post-sigmoid magnitude depends on other factors, such as the current value of the hidden unit and on the direction of change, as shown on FIG. 6. FIG. 6 illustrates how even though the pre-sigmoid deltas of the two hidden units are equal ($\Delta x_1 = \Delta x_2$) their post-sigmoid deltas are different ($\Delta y_1 \neq \Delta y_2$).

We can, however, estimate it for the first few evaluation steps, since we know the initial value of each hidden unit $R_0(h)$. The strategy we have found to work best is to estimate the optimal hidden units for the first few steps and then to iterate the hidden units in order for the rest of the steps.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting an object in an image, comprising:
   using a computer to perform:
   selecting a subwindow to be evaluated based upon a currently estimated likelihood of the object being detected within the subwindow;
   performing an evaluation step on the subwindow to determine if the object exists in the subwindow, wherein performing the evaluation step comprises updating the currently estimated likelihood of the object being detected in the subwindow; and if evaluation of the subwindow is not complete after the evaluation step,
   storing information associated with the subwindow to facilitate subsequent evaluation of the subwindow.

2. The method of claim 1, wherein storing the information associated with the subwindow comprises updating and storing the currently estimated likelihood of the object being detected within the subwindow.

3. The method of claim 2, wherein storing the information associated with the subwindow comprises:
   storing the subwindow itself or location information for the subwindow; and
   storing intermediate results, if any, associated with evaluation of the subwindow.

4. The method of claim 1, wherein selecting the subwindow to be evaluated comprises:
   selecting a new subwindow; or
   selecting a partially evaluated subwindow.

5. The method of claim 1, wherein if the currently estimated likelihood of the object being detected in the subwindow drops below a minimum value, the method further comprises discarding the subwindow.

6. The method of claim 1, wherein if currently estimated likelihood of the object being detected in the subwindow exceeds a predetermined value, the method further comprises fully evaluating the subwindow.

7. The method of claim 1, wherein storing the information associated with the subwindow comprises:
   storing the information ordered by estimated likelihood to facilitate selecting the subwindow later based on the currently estimated likelihood of the object being detected within the subwindow.

8. The method of claim 1, wherein performing the evaluation step on the subwindow comprises:
   using an incrementally evaluatable detector which is based on a neural network.

9. A method for detecting an object in an image, comprising:
   using a computer to perform:
   performing a first evaluation step on a first subwindow in the image to determine if the object exists in the first subwindow;
   performing a first evaluation step on a second subwindow in the image to determine if the object exists in the second subwindow; and
   subsequently performing a second evaluation step on the first subwindow;
   wherein performing the first evaluation step on the first or second subwindow or performing the second evaluation step on the first subwindow comprises:
   selecting the subwindow to be evaluated based upon a currently estimated likelihood of the object being detected within the subwindow;
   performing an evaluation step on the subwindow; and
   if evaluation of the subwindow is not complete after the evaluation step, storing information associated with the subwindow to facilitate subsequent evaluation of the subwindow.

10. A computer-readable storage device storing instructions that when executed by a computer cause the computer to perform a method for detecting an object in an image, the method comprising:
    selecting a subwindow to be evaluated based upon a currently estimated likelihood of the object being detected within the subwindow;
    performing an evaluation step on the subwindow to determine if the object exists in the subwindow, wherein performing the evaluation step comprises updating the currently estimated likelihood of the object being detected in the subwindow; and
    if evaluation of the subwindow is not complete after the evaluation step, storing information associated with the subwindow to facilitate subsequent evaluation of the subwindow.

11. The computer-readable storage device of claim 10, wherein storing the information associated with the subwindow comprises:
    updating and storing the currently estimated likelihood of the object being detected within the subwindow.

12. The computer-readable storage device of claim 11, wherein storing the information associated with the subwindow comprises:
    storing the subwindow itself or location information for the subwindow; and
    storing intermediate results, if any, associated with evaluation of the subwindow.

13. The computer-readable storage device of claim 10, wherein selecting the subwindow to be evaluated comprises:
    selecting a new subwindow; or
    selecting a partially evaluated subwindow.

14. The computer-readable storage device of claim 10, wherein if the currently estimated likelihood of the object being detected in the subwindow drops below a minimum value, the method further comprises discarding the subwindow.

15. The computer-readable storage device of claim 10, wherein if currently estimated likelihood of the object being detected in the subwindow exceeds a predetermined value, the method further comprises fully evaluating the subwindow.

16. The computer-readable storage device of claim 10, wherein storing the information associated with the subwindow comprises:
    storing the information ordered by estimated likelihood to facilitate selecting the subwindow later based on the currently estimated likelihood of the object being detected within the subwindow.

17. The computer-readable storage device of claim 10, wherein performing the evaluation step on the subwindow comprises:
    using an incrementally evaluatable detector which is based on a neural network.

18. A computer-readable storage device storing instructions that when executed by a computer cause the computer to perform a method for detecting an object in an image, the method comprising:
    performing a first evaluation step on a first subwindow in the image to determine if the object exists in the first subwindow;
    performing a first evaluation step on a second subwindow in the image to determine if the object exists in the second subwindow; and
    subsequently performing a second evaluation step on the first subwindow;
    wherein performing the first evaluation step on the first or second subwindow or performing the second evaluation step on the first subwindow comprises:
        selecting the subwindow to be evaluated based upon a currently estimated likelihood of the object being detected within the subwindow;
        performing an evaluation step on the subwindow; and
        if evaluation of the subwindow is not complete after the evaluation step, storing information associated with the subwindow to facilitate subsequent evaluation of the subwindow.

19. An apparatus that detects an object in an image, comprising:
    one or more processors; and
    a memory coupled to the one or more processors and storing program instructions executable by the one or more processors to implement:
        selecting a subwindow to be evaluated based upon a currently estimated likelihood of the object being detected within the subwindow;
        performing an evaluation step on the subwindow to determine if the object exists in the subwindow, wherein performing the evaluation step comprises updating the currently estimated likelihood of the object being detected in the subwindow; and if evaluation of the subwindow is not complete after the evaluation step,
        storing information associated with the subwindow to facilitate subsequent evaluation of the subwindow.

20. The apparatus of claim 19, wherein the program instructions are executable by the one or more processors to implement updating and storing the currently estimated likelihood of the object being detected within the subwindow.

21. The apparatus of claim 19, wherein the program instructions are executable by the one or more processors to implement:
    storing the subwindow itself or location information for the subwindow; and
    storing intermediate results, if any, associated with evaluation of the subwindow.

22. The apparatus of claim 19, wherein the program instructions are executable by the one or more processors to implement:
    selecting a new subwindow or a partially evaluated subwindow.

23. The apparatus of claim 19, wherein the program instructions are executable by the one or more processors to implement:
    if the currently estimated likelihood of the object being detected in the subwindow drops below a minimum value, discarding the subwindow.

24. The apparatus of claim 19, wherein the program instructions are executable by the one or more processors to implement:
    if the currently estimated likelihood of the object being detected in the subwindow exceeds a predetermined value, fully evaluating the subwindow.

25. The apparatus of claim 19, wherein the program instructions are executable by the one or more processors to implement:
    storing the information ordered by estimated likelihood to facilitate selecting the subwindow later based on the currently estimated likelihood of the object being detected within the subwindow.

26. The apparatus of claim 19, wherein performing the evaluation step on the subwindow comprises:
    using an incrementally evaluatable detector which is based on a neural network.

27. An apparatus that detects an object in an image, comprising:
    one or more processors; and
    a memory coupled to the one or more processors and storing program instructions executable by the one or more processors to implement:
        performing a first evaluation step on a first subwindow in the image to determine if the object exists in the first subwindow;
        performing a first evaluation step on a second subwindow in the image to determine if the object exists in the second subwindow; and
        subsequently performing a second evaluation step on the first subwindow;
        wherein performing the first evaluation step on the first or second subwindow or performing the second evaluation step on the first subwindow comprises:
            selecting the subwindow to be evaluated based upon a currently estimated likelihood of the object being detected within the subwindow;
            performing an evaluation step on the subwindow; and
            if evaluation of the subwindow is not complete after the evaluation step, storing information associated with the subwindow to facilitate subsequent evaluation of the subwindow.

* * * * *